No. 788,591. PATENTED MAY 2, 1905.
G. NILSEN.
COMBINED CIGAR CUTTER AND RECEPTACLE.
APPLICATION FILED JAN. 23, 1904.

WITNESSES:
B. Patterson
Mo. Shipley

INVENTOR
G. Nilsen
BY Clark Deemer & Co
ATTORNEYS.

No. 788,591. Patented May 2, 1905.

UNITED STATES PATENT OFFICE.

GJERULD NILSEN, OF BARREN ISLAND, NEW YORK.

COMBINED CIGAR CUTTER AND RECEPTACLE.

SPECIFICATION forming part of Letters Patent No. 788,591, dated May 2, 1905.

Application filed January 23, 1904. Serial No. 190,279.

*To all whom it may concern:*

Be it known that I, GJERULD NILSEN, a citizen of the United States, and a resident of Barren Island, county of Kings, and State of New York, have invented certain new and useful Improvements in a Combined Cigar Cutter and Receptacle, of which the following is a specification, reference being had to the accompanying drawings, forming a part thereof, in which similar characters of reference indicate corresponding parts.

This invention relates to a combined cigar cutter and receptacle, the object thereof being to provide a compact and simply-constructed device of this character which is adaptable for being carried in the pocket and for cutting grooves in the sides of cigars and preserving the cut-off parts and also for containing matches.

The device comprises a normally closed receptacle or box having two compartments and a hinged spring-actuated lid having a cutter which automatically operates by the act of closing the lid of the box.

The invention will be hereinafter fully described, and specifically set forth in the annexed claims.

Figure 1:
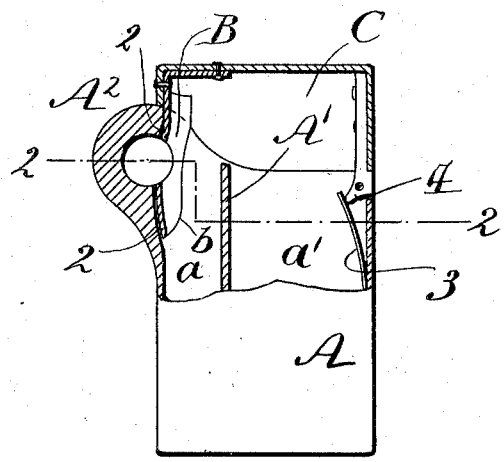
Figure 2:
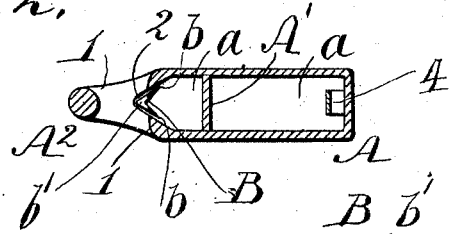
Figure 3:
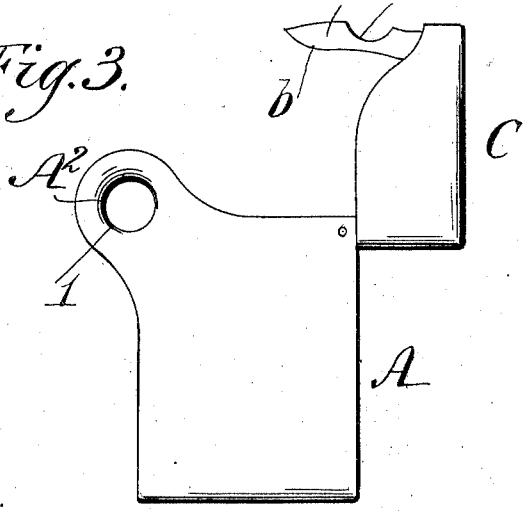

In the accompanying drawings, forming part of this specification, Figure 1 is a side elevation of the device shown closed and partly broken away; Fig. 2, a sectional plan view taken on the line 2 2 of Fig. 1, and Fig. 3 is a side view showing the device opened in position ready for cutting a cigar.

In the practice of my invention I provide, primarily, a box A, having a vertical partition A', which forms the two compartments $a$ and $a'$ for respectively containing the cut-off parts of cigars and a plurality of matches.

Located at the upper left-hand corner of the box A is an extension $A^2$, having a circular opening leading transversely therethrough which embodies sockets 1 1 at each side for the reception of a cigar end. Leading through the said extension $A^2$ is a channel 2, which communicates with the compartment $a$ and forms a guideway for the cutter or knife B, which is secured to the lid C of the box.

The knife B is approximately V-shaped in sectional plan and has two sharpened edges $b$ and a segmental notch $b'$, which permits of the cigar being readily extracted after the knife has cut a V-shaped groove therein and severed a part thereof.

The lid C of the box is maintained in either closed or open position by means of the spring 3 and lug 4, common to the ordinary matchbox, which closes the box with some force, thus assisting the cutter to perform its functions.

In the operation and use of the device when it is desired to cut a groove in the cigar end said end is inserted into one of the sockets 1 of the extension $A^2$ while the lid is in opened position, as shown by Fig. 3 of the drawings. Then the lid is closed, and the act of closing the same carries the knife through that part of the side of the cigar which is within the channel 2 and cuts a V-shaped groove therein, dropping the cut-away part into the compartment $a$, and then owing to the notch $b'$ in the cutter B the cigar can be readily removed. By cutting cigars in this way I provide them with an efficient opening for draft without severing the end. Thus the smoker is not liable to draw tobacco-dust into the throat, as is the case when the entire end of the cigar is severed.

Having now described my invention, what I claim as new, and desire to secure by Letters Patent, is—

1. As a cigar cutter and receptacle, the combination with the box having the extension embodying the sockets and vertical channel, of the spring-actuated lid and knife having a medial recess secured thereto, substantially as shown and described.

2. As a cigar cutter and receptacle, the combination with the box having the side sockets and vertical groove communicating therewith, of the knife of V-shaped cross-sectional contour, and having a medial recess, and the spring-actuated hinged lid carrying the knife, substantially as shown and described.

3. As a cigar cutter and receptacle, the combination with the box having the compartments and the extension having the side sockets and segmental channel which communicates with said sockets and with the interior of the box, of the segmental knife which is V-shaped in cross-section, and having a medial recess, and a spring-actuated hinged lid, said lid secured to the knife so that said knife moves therewith, substantially as shown and described.

In testimony that I claim the foregoing as my invention I have signed my name, in presence of two witnesses, this 20th day of January, 1904.

GJERULD NILSEN.

Witnesses:
B. PATTERSON,
M. SHIPLEY.